United States Patent Office 3,443,382
Patented May 13, 1969

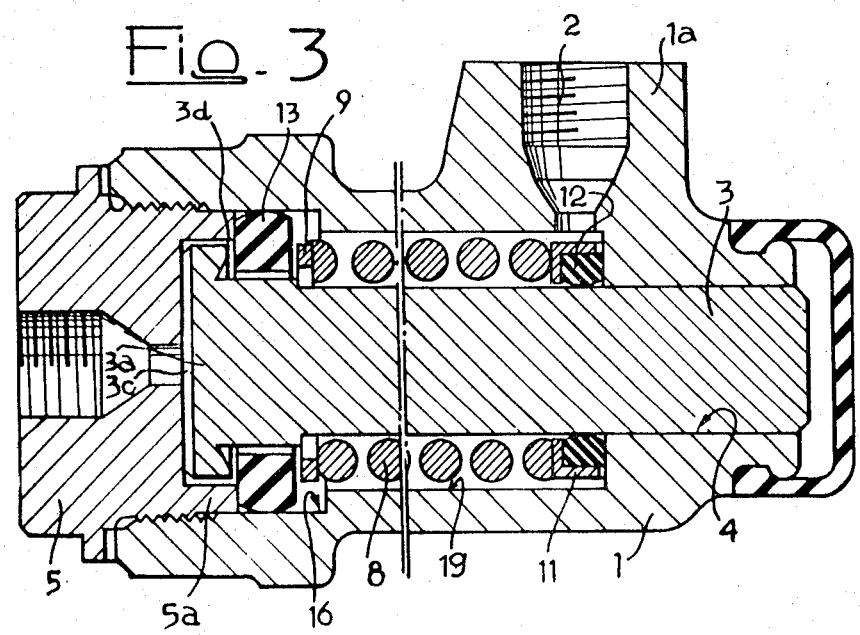
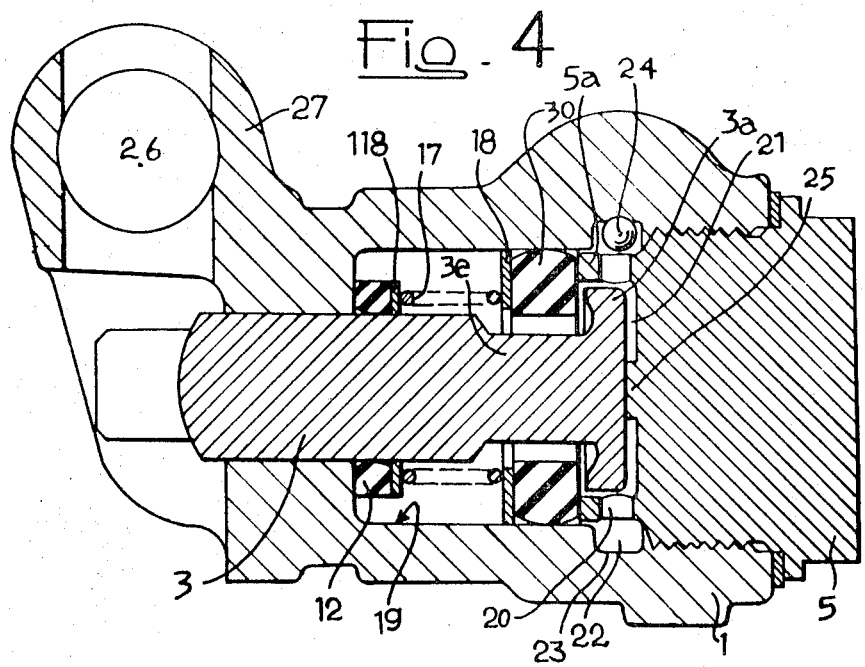

3,443,382
PRESSURE REDUCER DEVICE FOR HYDRAULIC BRAKES
Philip Sidney Baldwin, Florence, Italy, assignor of one-half to Fiat Società per Azioni, Turin, Italy
Filed Dec. 6, 1966, Ser. No. 599,536
Claims priority, application Italy, Dec. 7, 1965, 27,413/65; Apr. 30, 1966, 10,326/66
Int. Cl. F15b *3/00;* F16d *65/32*
U.S. Cl. 60—54.5               8 Claims

ABSTRACT OF THE DISCLOSURE

The braking pressure reducer for motor vehicles comprises a cylinder and a plunger-type piston having a head arranged inside of the cylinder and a stem slidable in a bore made in one of the end walls of the cylinder, a reaction spring biasing the piston towards the other end wall of the cylinder, and a sealing ring in sliding contact with the cylinder bore mounted with axial and radial play on the piston stem. The piston head is made on its surface facing the sealing ring with a circular bead having a diameter greater than that of the inner bore in the ring, whereby upon protractile stroke of the piston this bead adheres to the ring and closes the communication between the chambers lying on the opposite sides of the piston head. The cylinder is closed at its said other end by a plug having a cylindrical axial projection the length of which is such as to held the sealing ring clear of said bead on the piston head when the device is inoperative and the piston is in its retracted end position towards the said plug.

---

The present invention relates to pressure reducers, more particularly for hydraulic brake mechanisms. The reducer is of the spring-loaded piston and cylinder type having a high and a low pressure chamber, the essence of the invention being in the provision of an arrangement for making and breaking connection between the two said chambers. Briefly, such control is effected by abutment of an enlarged piston head with a resilient annular seal. Connection between the two chambers is severed when a braking action commences and pressure fluid from a hydraulic brake master cylinder is supplied to the high pressure chamber of the reducer. Such severance of course prevents the fluid from reaching the low pressure chamber and thus, for instance, the brake units of a vehicle.

One embodiment of the invention is particularly suited for cooperation with means for varying the braking force applicable to the rear wheels of a vehicle in dependence upon the load on the vehicle rear axle.

Pressure reducers are known, for instance through German Patent 1,195,185 or U.S. Patent 3,088,285, which comprise a cylinder and a piston therein which is substantially smaller in diameter than the cylinder bore and which projects from the cylinder through an opening provided in one end wall thereof. In such a reducer, the piston has a head of enlarged diameter carrying an annular seal which subdivides the cylinder bores into (i) an annular chamber which is confined between the outer periphery of the piston and the inner wall of the cylinder, which is referred to as the high pressure chamber, and which is arranged to be connected with the outlet of the hydraulic master cylinder, and (ii) a further chamber which is closed by the circular face of the piston head, which is referred to as the low pressure chamber and which is arranged to be connected with the cylinders operating the brake blocks active on the vehicle wheels. A device of this type further comprises a reaction spring which opposes movement of the piston in the direction of the high pressure chamber, which urges the piston towards the low pressure chamber and which maintains it in its stroke end position. The piston head and the annular seal which seals the gap between the piston and inner cylinder wall are further so shaped that the seal itself acts as a valve for controlling intercommunication of the low and high pressure chambers.

In previously proposed pressure reducers of the above described type the low pressure chamber connects, through passages which have been bored in the cylinder skirt and through radial openings, with the high pressure chamber, movement of the annular seal serving to intercept or establish interconnection of the two chambers.

Although pressure reducers of the above described construction are generally simple and reliable, they suffer from the drawback that there is rapid wear of the circumferential portion of the resilient annular seal which effects sealing between the piston head and the inner cylinder wall and which acts at the same time as a valve for controlling intercommunication of the high and low pressure chambers.

The present invention deals with the problem of avoiding the above drawback and has for its main object the provision of a pressure reducer substantially of the above described type but which does not require frequent replacement of the said annular seal. A further object is the provision of a pressure reducer which is even simpler and less expensive than the pressure reducers known heretofore.

According to these and other objects, the invention comprises a pressure reducer device, more particularly for hydraulic brake mechanisms on vehicles, and of the spring-loaded piston and cylinder type referred to herein as having a high and a low pressure chamber, wherein the piston carries a head of larger diameter than the body of the piston, sealing between the said head and the inner wall of the cylinder being effected during operation of the reducer by abutment of the said head with an annular seal of resilient material, the bore of the annular seal being smaller than the outer diameter of the piston head portion and larger than the outer diameter of the piston body and the outer diameter of the seal before assembly thereof in the cylinder slightly exceeding the cylinder bore so that the assembled seal sealingly engages the cylinder inner wall and surrounds the piston body near its head portion with an axial clearance, and further means being arranged within the cylinder for limiting movement of the said annular seal towards the low pressure chamber.

There thus exists a path for pressure fluid from the high to low pressure chambers, which path can be closed by abutment of the piston head with the annular seal.

Preferably, the means for limiting movement of the annular seal towards the low pressure chamber comprises an axial annular extension on a plug closing the cylinder on the side of the low pressure chamber.

Advantageously, the piston head is provided, on its side facing the annular seal, with an axial annular sealing lip situated at the level of the periphery thereof and tapering towards its free end.

In accordance with one embodiment of the invention, the annular seal is fitted on a tubular projection of an annular disc made of rigid material, the said projection extending towards the head portion of the piston and being assembled with an axial clearance with respect to the piston body and the said disc being assembled with a slight axial clearance with respect to the inner wall of the cylinder.

According to a modification, the device is further simplified and operation thereof made even more reliable. According to this modification the piston head and annular seal are so proportioned that an annular surface is formed between a circumference along which their mutual contact takes place and the circumference of the bore in the seal, this annular surface facing the piston head and being of sufficient size to receive an hydraulic thrust capable of opposing deformation of the annular seal in the direction of the piston head during removal of the head from the seal so that the annular seal can be freely mounted in the cylinder without the need for a stiffening disc.

According to a further modification, and in order to reduce mobility of the seal in the direction of the high pressure chamber, the said seal is biased by additional spring means.

These and other objects and advantages of the invention will be clear from the following description, given with reference to the accompanying drawings which are by way of example and in which.

Figure 1:
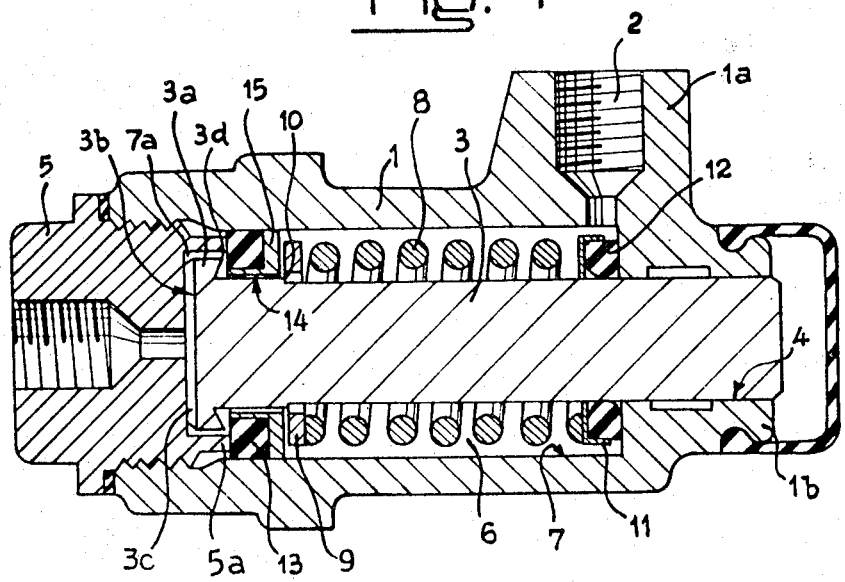
FIG. 1 is an axially longitudinal sectional view of a pressure reducer according to the invention.

FIG. 3 is an axially longitudinal sectional view of a modified pressure reducer according to the invention; and FIG. 4 is an axially longitudinal sectional view of a pressure reducer according to a further modification of the invention, the reducer being suitable for cooperation with means for varying the breaking force applied to the rear wheels of a vehicle in dependence upon the load on the vehicle rear axle.

In all the embodiments shown, corresponding elements are denoted by corresponding reference numerals.

Figure 2:
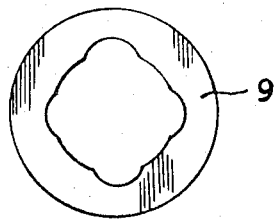
FIG. 2 is a front elevational view of an element of the reducer shown in FIG. 1.

The reducer shown in FIGS. 1 and 2 of the drawings comprises a cylinder 1 having a top boss 1a in which a hole 2 is bored to connect with the cylinder interior or bore. A piston 3 is movably mounted within the cylinder bore, one end of the said piston being arranged to project from the cylinder through a hole 4 formed in an end wall 1b. The other cylinder end is closed by a plug 5.

The piston 3 terminates at one end in a head 3a, the outer diameter of which is substantially larger than the diameter of the rest of the piston body, and which is normally accommodated, in the inoperative condition of the device, within an axial annular projection 5a on the plug 5 to form a "low pressure" chamber. As shown in FIG. 1, an axial clearance exists between the head 3a and the annular projection 5a. The end face 3b of the piston head 3a which faces the plug 5 is formed with a diametrical rib 3c, the provision of which avoids direct overall contact between the said face 3b and the surface of the plug 5 which opposes the face 3b.

A helical reaction spring 8 is arranged in an annular "high pressure" chamber 6 defined by the outer periphery of the piston 3 and the inner wall 7 of the cylinder 1. The chamber 6 connects, through the hole 2, with a conduit which leads to a master cylinder (not shown) and the said spring 8 bears at one of its ends on a washer 9. The washer 9 is urged by the spring against a step 10 formed on the body of the piston 3 and the other end of the spring bears against a disc 11 which surrounds an annular seal 12 of rubber or the like which is provided to prevent oil leakage from the cylinder along the length of the piston 3.

Furthermore, an annular seal 13 of resilient material is interposed between the washer 9 and the piston head 3a. This seal 13 is of rectangular cross sectional shape and of a diameter which, before its assembly within the bore of the cylinder 1, is slightly larger, such as by 0.03 mm., than the said cylinder bore. As shown, the seal 13 is mounted on a tubular projection 14 of a seal-stiffening disc 15 which is made of rigid material. The bores of the annular resilient seal 13 and of the mounting arrangement 14, 15 are selected so that there constantly exists an axial clearance between the central hole through the disc and the outer periphery of the piston 3 near its head portion 3a. Moreover, the ring 13 and its mounting arrangement 14, 15 are so proportioned that they can be assembled with the existence of a slight radial clearance, both with respect to the head portion 3a and with respect to the bearing washer 9.

The length of the axial projection 5a on the plug 5 is moreover so chosen as to prevent the annular seal 13 from adhering to a sealing lip 3d provided on the head portion 3a, arranged at the level of the periphery of the latter and tapering at its free end.

The sealing lip 3d performs an important function. As a result of its provision, the inner margin of the annular seal 13 can be subjected to the action of pressure also on its side facing the piston head 3a. In this way there is afforded quick opening of the interconnection of the high and low pressure chambers. Owing to the effects of deformation, of the seal 13, such quick opening would not occur if the face of the piston head 3a directed towards the seal were planar.

In use, the device operates as follows:

In its operative position the head portion 3a on the piston is held with its diametrical rib 3c in contact with the plug 5. Such contact is ensured by the action of the spring 8.

When a braking action commences, pressure fluid flows from the master cylinder (not shown) through the hole 2 and to the bore of cylinder 1. The said fluid then flows through the axial clearance existing between the arrangement 14, 15 and the periphery of the body of piston 3, through the radial clearance existing between the annular seal 13 and the head 3a of the piston, and finally through the axial clearance 7a existing between the periphery of the said head and the inner wall of the annular projection 5a on the plug. When the pressure of the fluid in the cylinder 1 reaches a sufficient value to overcome the opposing action of the spring 8, the piston 3 is moved away from the plug 5, the annular projection 3d on its head bearing on the seal 13 and thereby intercepting interconnection of the annular high pressure chamber 6 and the low pressure chamber existing between the head 3a and plug 5.

Following a further rise in the hydraulic pressure transmitted by the master cylinder, a thrust is generated which tends o move the piston 3 and its head portion 3a towards the plug 5 thus removing the projection 3d from the seal 13 and allowing pressure fluid to ooze towards the low pressure chamber and reestablish balance of the thrusts acting on the piston.

As braking ceases and the pressure in the chamber 6 drops, the piston 3 is moved in the direction of the plug 5 under the action of the spring 8, complete interconnection of the low and high pressure chambers being thus re-established.

The reducer shown in FIG. 3 of the drawings differs from that of FIGS. 1 and 2 in that it comprises a cylinder 1, the bore of which comprises three sections each of different diameter. The first section, 4, has slidably mounted therein a piston 3 which also extends into and through the second and intermediate section, 19, of the bore which is of larger diameter than section 4 and which accommodates the reaction spring 8. The head portion 3a of the piston is accommodated by the third section, 16, which is of larger diameter than the section 19.

A further difference between the reducer of FIG. 3 and that of FIGS. 1 and 2 resides in the fact that the annular seal 13 is so shaped that, although its profile in cross section is substantially rectangular, the side thereof which contacts the inner periphery of the cylinder is rounded in shape. This proportioning of the parts affords a substantial reduction in frictional resistance of the seal against its displacement within the cylinder bore.

In this embodiment, as in the previously described embodiment, the seal 13 is of a construction such that its outer diameter slightly exceeds the cylinder bore section in which it is arranged. For instance, it conveniently exceeds the diameter of the relevant section 16 of the bore in the cylinder 1 by 0.03 mm.

The bore of the annular seal 13 is itself larger than the outer diameter of the periphery of the section of the piston 3 near the head portion 3a, which piston section extends through the cavity in the seal 13. The bore of the latter and the outer diameter of the head 3a are preferably so selected that the sealing lip 3d is at the level of the mean diameter of the seal 13.

In the modified embodiment shown in FIG. 4 the seal 30, which acts as a cooperating seat with the head 3a on the piston 3, is slidably mounted in the intermediate cylinder section 19 and is pressed, in an inoperative condition of the reducer, against projection 5a on the plug 5 by the action of a locating spring 17, the ends of which spring bear on washers 18, 118, respectively adjacent the annular seals 30, 12. A portion 3e of the piston 3, which portion extends through the annular seal 30, is of reduced diameter, and the annular projection 5a on the plug 5 is formed with radial holes 20 therethrough for interconnecting the low pressure chamber 21 and an annular groove 22 formed in the wall of section 23 of the cylinder bore. The groove 22 is connected, through an opening 24, with a tapped hole (not shown) formed in a boss (not shown) on the cylinder 1, the said boss and hole being exactly similar to the hole 2 and boss 1a shown in FIG. 3. A further difference between the modified construction shown in FIG. 3 and the embodiment according to FIG. 4 resides in the manner of determining the stroke end position of the piston 3. In the latter embodiment the head 3a is formed without a cross rib and instead bears against a middle projection 25 formed on the plug 5.

Further, in the embodiment of FIG. 4, the reaction spring (not shown), which performs a similar function to the spring 8 of FIG. 3, is not arranged within the cylinder. Instead it is associated with a system known per se and acts through a lever (not shown) pivotable in a seat 26 formed in a projection 27 on the cylinder 1. In this way variation in resistance against movement of the piston is effected in dependence upon the load on the rear vehicle axle, as is described in Italian Patent No. 677,217.

Various modifications of the invention are of course possible within the scope of the appended claims.

Thus, for instance, the described reaction spring 8 (FIG. 1) can be replaced by a spring having a slight pre-load and merely intended to hold the two seals 12 and 13 in position. In this case the said spring would bear directly on the disc 15 as, owing to the slight preload, the washer 9 and its abutment stop 10 on the piston rod 13 would no longer be required, the latter being necessary only in a construction including the highly preloaded spring 8 which would otherwise deform the composite arrangement 13–15.

In an arrangement including a slightly pre-loaded spring the function of the spring 8 on the piston 3 can, if desired, be achieved by use of a highly preloaded spring, the preload of which is variable in dependence upon the load on the vehicle rear axle. In such a case the said spring is situated externally of the cylinder 1 and acts, either directly or indirectly, on that end of the piston 3 which extends beyond the cylinder 1.

What I claim is:

1. A device for varying hydraulic pressure for use in a pressure fluid line intermediate a fluid pressure source and a working point, comprising: a hollow cylinder having end closure means disposed at one end thereof, piston means having an enlarged head at one end thereof slidably mounted in said hollow cylinder with the piston head disposed adjacent said end closure means, fluid inlet and outlet means located in said hollow cylinder in communication with opposite sides of said piston head respectively, abutment means mounted on said end closure means extending into said hollow cylinder between said piston head and the internal surface of said hollow cylinder, said abutment means having a greater axial extent than said piston head, an annular resilient sealing ring disposed within said hollow cylinder about said piston adjacent said piston head, said sealing ring being disposed in fluid tight sliding engagement with the internal surface of said hollow cylinder and in spaced relation to said piston and having a radial extent sufficient to contact said piston head, and spring means for biasing said piston means towards said end closure means.

2. A device as set forth in claim 1 wherein said end closure means is comprised of a plug detachably secured to said cylinder and said abutment means comprises an axially extending annular extension integral with said plug.

3. A device as set forth in claim 1 further comprising an axially directed annular sealing lip formed on said piston head adjacent the periphery thereof on the side of said head facing said annular seal, said lip tapering towards the free end thereof.

4. A device as set forth in claim 1 further comprising stiffening means for said sealing ring comprising an annular disc of rigid material disposed adjacent the face of said sealing ring remote from said piston head and an axially extending tubular projection secured to the innermost periphery of said annular disc and extending towards said piston head, said tubular projection being spaced from said piston and said annular disc being spaced from said piston and the inner surface of said hollow cylinder.

5. A device as set forth in claim 3 wherein said piston head and said sealing ring are so proportioned that an annular surface is formed on said sealing ring between the line of contact of said lip with said sealing ring and the inner periphery of said sealing ring, said annular surface facing said piston head and being of sufficient size to receive an hydraulic thrust capable of opposing deformation of said sealing ring in the direction of said piston head during removal of said piston head from said sealing ring, so that said sealing ring may be freely mounted in said cylinder without the need for stiffening means.

6. A device as defined in claim 1 wherein the said annular seal is formed, in cross section, of substantially rectangular shape but with its outer wall of arcuate profile.

7. A device as defined in claim 1 wherein additional spring means are provided to reduce mobility of the said annular seal in the direction of the high pressure chamber.

8. A device as defined in claim 1 wherein the outer diameter of the said annular seal is larger than the associated region of the said cylinder bore by in the order of 0.03 mm.

References Cited

UNITED STATES PATENTS 3,088,285  5/1963  Glasiosa et al.

MARTIN P. SCHWADRON, *Primary Examiner.*

ROBERT R. BUNEVICH, *Assistant Examiner.*

U.S. Cl. XR

60—25; 222—340